Figure 1:
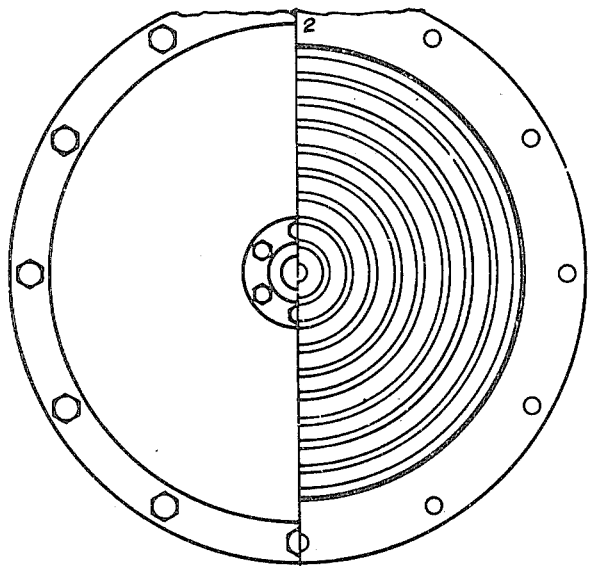

July 13, 1948.                E. E. TURNER, JR                2,444,967
                                  OSCILLATOR
Filed March 23, 1936                                    2 Sheets—Sheet 1

INVENTOR.
Edwin E Turner Jr
BY
ATTORNEY.

July 13, 1948.  E. E. TURNER, JR  2,444,967
OSCILLATOR

Filed March 23, 1936  2 Sheets-Sheet 2

INVENTOR.
Edwin E. Turner Jr.

BY

ATTORNEY.

Patented July 13, 1948

2,444,967

UNITED STATES PATENT OFFICE 2,444,967

OSCILLATOR

Edwin E. Turner, Jr., West Roxbury, Mass., assignor, by mesne assignments, to Submarine Signal Company, Boston, Mass., a corporation of Delaware Application March 23, 1936, Serial No. 70,365

6 Claims. (Cl. 177—386)

The present invention relates to a device for producing mechanical vibrations and in particular mechanical vibrations having a rapid rate of oscillation within the range adapted to produce in a proper medium, particularly in water as in submarine signaling, compressional waves above the ordinary range of audibility of the human ear.

In the present invention the vibrations of the nature described above are produced over a large vibratory surface in such a manner that the propagation of the waves in the medium is in a beam, although for lower frequencies the beam may be spread to form a radiating cone of desired angular opening, the factors controlling the size of the opening depending upon the relation of the wave length, the area and form of the vibrating surface in a manner known in the prior art.

In the present invention the beam is generated by means of a series of elements operating simultaneously on a plate of vibratory surface, the relationship of the length of the elements on the plate, their masses and the thickness of the plate, conforming to the principles laid down in the companion Edwin E. Turner application, Serial No. 677,179, filed June 23, 1933, which matured into United States Patent No. 2,407,328, on September 10, 1946. In the present invention the elements impressing the vibratory energy on the plate may be either magnetostrictive in which the mechanical vibrations are developed through the magnetostrictive effect of the flux passing through the elements themselves, electrodynamic or magnetic. In the present application the embodiment including the magnetostrictive system is shown and described.

At very high frequencies such as those within the range of 20,000 cycles per second and higher, there is a distinct tendency for electric current to crowd near the surface of the conductor and as a result in magnetostrictive and nickel elements, therefore, the flux and magnetostrictive action take place to the greatest degree near the external surface. This also may cause a difference in vibratory stresses longitudinally in various parts of the nickel and as a result the nickel elements may not operate at the maximum efficiency. It is highly desirable, however, on account of the high frequencies and the short wave lengths that result, to drive the vibratory surfaces at a large number of points and this the applicant has accomplished in his prior application referred to above. However, in the present application this is also accomplished and at the same time the magnetostrictive elements are operated more efficiently because of a decrease in the mechanical and electrical losses as will appear from the description in the specification.

Figure 2:
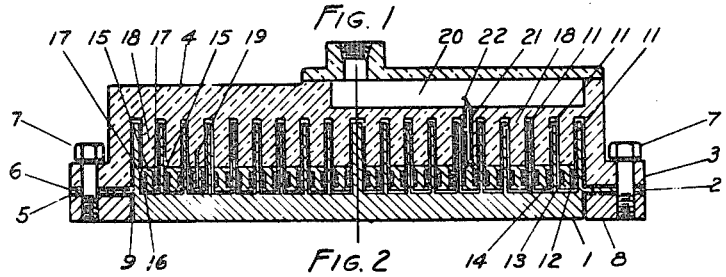
Figure 3:
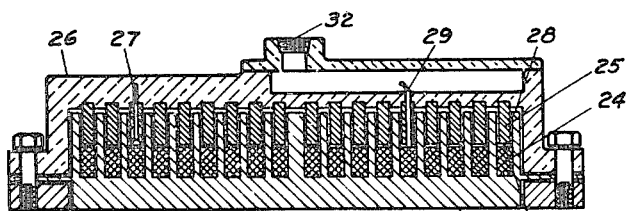
Figure 4:
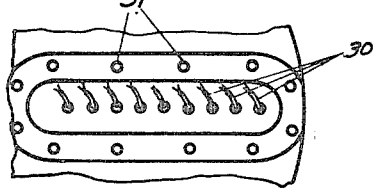
Figure 5:
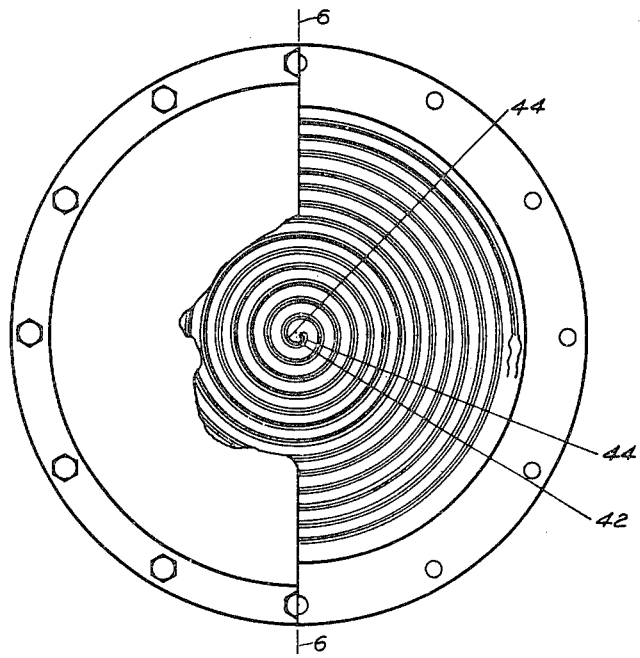
Figure 6:
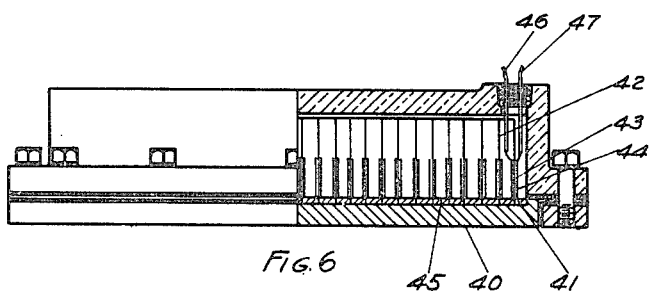
Figure 7:
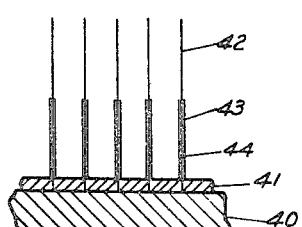

The invention will be more fully understood from the description of the embodiment given below and illustrated in the drawings in which Fig. 1 shows a plan view with a portion of the top case removed; Fig. 2 shows a section taken at right angles to the line 2—2 of Fig. 1; Fig. 3 shows a modified section of the device shown in Fig. 2; Fig. 4 shows a detail of the device shown in Figs. 1, 2 or 3; Fig. 5 shows a further modification in plan of the device shown in Fig. 1 with a portion of the case removed; Fig. 6 shows a section taken on the line 6—6 of Fig. 5; and Fig. 7 shows a detail of the device shown in Fig. 6.

In the device shown in Figs. 1 and 2 there is provided a large plate 1 which may be approximately two feet or larger in diameter and of a suitable thickness as will be explained later. The plate 1 may be provided with a flange 2 the surface of which abuts a similar flange 3 of a casing 4 and to which it may be held in liquid-tight relationship by means of proper gaskets 5 and 6 and the series of bolts 7, 7 spaced around the flange 3. A ring 8 may be provided to make the outer surface of the plate 1 continuous with the edge of the casing, but if preferred the ring 8 and the plate 1 may be made of a single piece with a groove 9 cut, as indicated, to provide a thin supporting surface for the plate 1.

The plate 1, as indicated in Fig. 2, is made integral with a series of concentric rings 11, 11, 11, etc., spaced at a distance apart less than the thickness of the plate, which may be accomplished either by turning the rings 11, 11, etc., out of the same original piece of material as the plate 1, or else the rings may be welded or riveted to the plate in any suitable manner. These rings 11, 11, etc., are preferably comparatively thin and of the order of 10 to 20 thousandths of an inch in thickness. The magnetostrictive rings 11, 11 are energized in Fig. 2 by coils 12, 13, 14, etc., which are concentric with the rings and on one side placed externally of the rings and on the other side internally thereof. These coils are mounted in magnetic retaining members or cores 15, 15 of magnetic material. The members 15 are cylindrical, surround the rings and are provided with poles 17, 17, 16, projecting on one side outwardly and on another side inwardly against the magnetostrictive elements 11, 11, thus forming two pairs of poles, one at the top and one at the bottom of the coils. The element 15 may be of magnetic material such as iron dust molded in a Bakelite mold, or other suitable molding compounds so that the hysteresis or eddy-current losses will be a minimum. The coils and cores, as they may be called, may be mounted with two coils in each individual cylindrical core and the cores may be cemented to the projecting cylindrical non-magnetic flanges 18 extending from the back or casing 4. The cylindrical flanges 18 are spaced on the back so that they fit between the cylindrical elements 11 and are aligned with the poles 17 and 16. The plate or mass 1 is so proportioned that the system including the rings 11 is a one-half wave length system and such that the node occurs substantially near the plate 1 although it may be positioned between the two poles 16 and 17. In accordance with this limitation the plate must have the proper thickness and mass, and for the same material the thickness is preferably one-quarter wave length or less in the direction normal to the surface of the wave generated and propagated in the material.

In the operation of the system the coil external of the cylindrical ring and the coil internal thereof tend to concentrate a flux in the space between the poles of the two cores which is the ring itself. This concentration of flux is in the part of the ring where a node of motion exists and where, therefore, the maximum variation of magnetostrictive flux is obtained. It is for this reason that the core 15 extends only a short distance up from the plate and does not extend the entire face of the cylindrical magnetostrictive element. The core 15 may be cemented to the upper projecting ring or flange 18 or it may be held as indicated by bolts 19 inserted upward from the bottom end of the core. These may preferably be made of brass.

The connections to the coils may be made through the casing 4. This is accomplished by providing a recess 20 in the top of the plate and further providing openings 21 to the flanges 18 which extend to the cores and through which connecting leads 22 may be inserted to make proper connections to the coils. Both alternating current and direct current may be provided to the coils 12, 13 and 14.

The modification shown in Fig. 3 includes a plate 23 similar to plate 1 of Fig. 2. The arrangement shown in Fig. 3 is quite similar to that of Fig. 2 except that no magnetic core 15 is provided, the coils 24 filling substantially the whole lower part of the space between adjacent cylinders. These coils are preferably mounted on the magnetic piece 25 set in the top case 26 and held in place by means of the bolts 27. The magnetic pieces 25 and the coils 24 may be cemented together with a flat copper ring 25' in between to keep the alternating flux out of the magnetic piece 25 and aligned so that they are positioned adjacent the magnetostrictive ring 28. The design other than that described is similar to that shown in Fig. 2, and leads for the coils may be brought out in similar fashion as indicated by 29 corresponding to 22 in Fig. 2.

All of the leads as indicated in Fig. 4 by 30, 30, 30, etc., are brought out to the top of the cover 26 and may be covered by a plate element, not shown, but threading into holes 31 as indicated in Fig. 4. All of the leads may be brought out through the cable fitting 32 as shown in Fig. 3.

The modification as shown in Figs. 5, 6 and 7 comprise a spiral shaped magnetostrictive element. In this modification as shown in Fig. 6 there is provided a heavy plate 40 which has on the inside a recessed portion 41 in which there is placed a magnetostrictive sheet 42 wound in a spiral as more clearly indicated in Fig. 5. On the outside of this sheet there is positioned a conductor 43 which also extends around the entire spiral to the inside 44 making the elements 43 and 44 one piece of material. This may be readily seen in Fig. 5 at the center of the spiral where the element 44 continues around the end of the magnetostrictive member 42. The member 44 does not extend all of the way up on both sides of the magnetostrictive member 42 but is concentrated near the lower end adjacent the plate. The magnetostrictive elements are mounted in the plate by means of some metallic material of suitable melting point to hold the spiral to the plate and yet not change the characteristic of the nickel elements themselves. The element surrounding the nickel spiral is supplied with current by means of the conductors 46 and 47 which in effect completes one turn of a coil about the magnetostrictive element 42 and therefore when supplied with current induces a flux therein longitudinally along the axis of the spiral element.

An enlarged section of a portion of the conductor shown in Fig. 6 is shown in Fig. 7 and indicates quite clearly the relative sizes and positions of the magnetostrictive member 42 and the surrounding conductor 44. The surrounding conductor 44 is preferably sufficiently long to insure the induction of the magnetostrictive flux in a position close to the node in the spiral.

The same principles stated above with regard to the distance between cylindrical elements apply equally here to the distance between spiral convolutions and the principles also stated above are equally well applied to the relations of the thickness of the plates. The system is a one-half wave length system as a whole and convolutions are spaced apart such that the plate moves as a whole.

Having now described my invention, I claim:

1. A device for producing mechanical vibrations of very high frequencies, comprising a plate, a thin member supporting said plate at its edges and means formed integral with the plate consisting of a plurality of concentric magnetostrictive rings, a plurality of coils surrounding said rings, one coil being positioned on the external and one on the internal side of each of said rings, a casing covering said diaphragm, and magnetic means supported from said casing and projecting into the space between said rings.

2. A device for producing mechanical vibrations of very high frequencies, comprising a plate member, means vibrating said plate member including a plurality of magnetostrictive rings positioned concentrically on said plate, and a plurality of coils positioned externally and internally of each of the rings for vibrating the same.

3. A device for producing a beam of supersonic compressional wave energy, comprising a plate having a large diameter compared with the wave length of the wave to be produced, a plurality of rings mounted concentrically with the center of said plate and forming with the plate a half wave length system, a plurality of coils surrounding said rings, each ring having a coil externally thereof and internally thereof, and means completing the magnetic path about the other end of the ring.

4. A device for producing a beam of supersonic compressional wave energy, comprising a plate having a large diameter compared with the wave length of the wave to be produced, a plurality of rings mounted concentrically with the center of said plate and forming with the plate a half wave length system, a plurality of coils surrounding said rings, each ring having a coil externally thereof and internally thereof, said coils being positioned at the portion of said ring near the plate, and means providing magnetic poles at both ends of said coil.

5. A magnetostrictive oscillator, comprising a plate element having a plurality of magnetostrictive cylinders integral therewith and projecting therefrom concentric with the center of said plate, said cylinders and said plate forming one-half wave length system, means providing electromagnetic flux at the base of said cylinders including a coil positioned externally of each cylinder and a coil positioned internally thereof, and means supporting said plate and forming a casing about the back of said cylinders.

6. A device for producing mechanical vibrations of very high frequency, comprising a plate member having a plurality of magnetostrictive rings formed and positioned concentrically with the center thereof, and means positioned externally and internally of each of said rings for inducing electromagnetic flux therein for vibrating the same.

EDWIN E. TURNER, Jr.

REFERENCES CITED

The following references are of record in the file of this patent:

UNITED STATES PATENTS

| Number | Name | Date |
| --- | --- | --- |
| 1,604,532 | Riegger | Oct. 26, 1926 |
| 2,007,746 | Ringel | July 9, 1935 |
| 2,063,950 | Steinberger | Dec. 15, 1936 |
| 2,076,330 | Wood et al. | Apr. 6, 1937 |

FOREIGN PATENTS

| Number | Country | Date |
| --- | --- | --- |
| 298,382 | Great Britain | Oct. 11, 1928 |
| 402,830 | Great Britain | Dec. 11, 1933 |
| 405,620 | Great Britain | Jan. 26, 1934 |